(12) United States Patent
Koo et al.

(10) Patent No.: US 9,226,268 B2
(45) Date of Patent: Dec. 29, 2015

(54) APPARATUS AND METHOD FOR DRX OPERATING IN A WIRELESS COMMUNICATION SYSTEM

(75) Inventors: Ja-Yong Koo, Seoul (KR); Sang-Min Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 996 days.

(21) Appl. No.: 13/049,341

(22) Filed: Mar. 16, 2011

(65) Prior Publication Data

US 2011/0228733 A1 Sep. 22, 2011

(30) Foreign Application Priority Data

Mar. 16, 2010 (KR) .................. 10-2010-0023485

(51) Int. Cl.
*H04W 72/04* (2009.01)
*H04W 76/04* (2009.01)

(52) U.S. Cl.
CPC ............ *H04W 72/04* (2013.01); *H04W 76/048* (2013.01)

(58) Field of Classification Search
None
See application file for complete search history.

(56) References Cited

U.S. PATENT DOCUMENTS

| 2009/0073907 | A1* | 3/2009 | Cai ............................... 370/311 |
| 2010/0323683 | A1* | 12/2010 | Kazmi et al. ............... 455/422.1 |
| 2013/0094463 | A1* | 4/2013 | Mahalleh et al. ............ 370/329 |

* cited by examiner

*Primary Examiner* — Faruk Hamza
*Assistant Examiner* — Tito Pham
(74) *Attorney, Agent, or Firm* — Jefferson IP Law, LLP

(57) ABSTRACT

An apparatus and method for Discontinuous Reception (DRX) operation of a Mobile Station (MS) in a Voice over Internet Protocol (VoIP) based wireless communication system are provided. The method for allocating semi-permanent resources considering the DRX operation of the MS includes determining if DRX of an MS for allocating semi-permanent resources has been activated, transmitting semi-permanent resource allocation instruction information to the MS if the DRX of the MS has been activated, determining a slot to allocate semi-permanent resources to the MS, transmitting semi-permanent resource allocation information to the MS if the slot to allocate the semi-permanent resources to the MS is determined, and allocating the semi-permanent resources to the MS every semi-permanent resource allocation cycle.

8 Claims, 5 Drawing Sheets

APPARATUS AND METHOD FOR DRX OPERATING IN A WIRELESS COMMUNICATION SYSTEM

PRIORITY

This application claims the benefit under 35 U.S.C. §119(a) of a Korean patent application filed in the Korean Intellectual Property Office on Mar. 16, 2010 and assigned Serial No. 10-2010-0023485, the entire disclosure of which is hereby incorporated by reference.

BACKGROUND OF THE INVENTION

1. Field of the Invention

The present invention relates to an apparatus and method for providing a Voice over Internet Protocol (VoIP) service in a wireless communication system. More particularly, the present invention relates to an apparatus and method for operating Discontinuous Reception (DRX) in a VoIP based wireless communication system.

2. Description of the Related Art

Voice over Internet Protocol (VoIP) services refer to services supporting a voice call in the form of packet data. That is, the VoIP service is a technology proposed to provide voice services through a packet network such as an Internet Protocol (IP) network compared to a circuit switched network such as a Public Switched Telephone Network (PSTN).

In the VoIP service, an overhead caused by control and feedback information can increase in proportion to the number of service users. Accordingly, to reduce the overhead of the control and feedback information, wireless communication systems providing VoIP services provide a semi-permanent resource allocation technique. The semi-permanent resource allocation technique is a technique for allocating semi-permanent resources to a Mobile Station (MS), to reduce an overhead caused by a physical control channel for resource allocation.

To reduce the power consumption of MSs, wireless communication systems provide a Discontinuous Reception (DRX) technique. The DRX technique is a technique for an MS to monitor a physical control channel only in a specific subframe, thereby being capable of reducing the power consumption of the MS. The MS using the DRX technique can advantageously reduce the power consumption of the MS while maintaining connectivity with a serving Base Station (BS).

VoIP based wireless communication systems can reduce overheads caused by control and feedback information and reduce the power consumption of MSs, using the semi-permanent resource allocation technique and the DRX technique. In this case, the MS can receive a physical control channel only during a slot corresponding to a DRX activity duration of the MS. Thus, a BS has to allocate semi-permanent resources only to the slot corresponding to the DRX activity duration of the MS.

As described above, in a case where a VoIP based wireless communication system uses a semi-permanent resource allocation scheme and a DRX technique, a BS allocates semi-permanent resources only to a slot corresponding to a DRX activity duration of an MS. That is, because semi-permanent resource allocation is restricted only to a DRX cycle, the BS has a problem that scheduling flexibility is deteriorated.

Also, because the BS allocates the semi-permanent resources only to the slot corresponding to the DRX activity duration, there may occur a phenomenon in which only the slot corresponding to the DRX activity duration runs short of resources.

SUMMARY OF THE INVENTION

An aspect of the present invention is to address at least the above-mentioned problems and/or disadvantages and to provide at least the advantages described below. Accordingly, an aspect of the present invention is to provide an apparatus and method for operating Discontinuous Reception (DRX) in a Voice over Internet Protocol (VoIP) based wireless communication system.

Another aspect of the present invention is to provide an apparatus and method for allocating semi-permanent resources considering DRX operation of a Mobile Station (MS) in a Base Station (BS) of a VoIP based wireless communication system.

A further aspect of the present invention is to provide an apparatus and method for operating DRX considering semi-permanent resource allocation in an MS of a VoIP based wireless communication system.

Yet another aspect of the present invention is to provide an apparatus and method for controlling an MS to independently operate a semi-permanent resource allocation cycle and a DRX cycle in a BS of a VoIP based wireless communication system.

Still another aspect of the present invention is to provide an apparatus and method for independently operating a semi-permanent resource allocation cycle and a DRX cycle in an MS of a VoIP based wireless communication system.

The above aspects are addressed by providing an apparatus and method for DRX operating in a wireless communication system.

In accordance with an aspect of the present invention, a method for allocating semi-permanent resources in a BS of a VoIP based wireless communication system is provided. The method includes determining if DRX of an MS for allocating semi-permanent resources has been activated, transmitting semi-permanent resource allocation instruction information to the MS if the DRX of the MS has been activated, determining a slot to allocate semi-permanent resources to the MS, transmitting semi-permanent resource allocation information to the MS if the slot to allocate the semi-permanent resources to the MS is determined, and allocating the semi-permanent resources to the MS every semi-permanent resource allocation cycle.

In accordance with another aspect of the present invention, a method for operating the DRX in an MS of a VoIP based wireless communication system is provided. The method includes activating DRX if a DRX cycle arrives, driving a timer if semi-permanent resource allocation instruction information is received from a serving BS in a state where the DRX is activated, and determining a semi-permanent resource allocation cycle in the semi-permanent resource allocation information if semi-permanent resource allocation information is received from the serving BS in the course of driving the timer. The DRX cycle and the semi-permanent resource allocation cycle are operated separately.

In accordance with a further aspect of the present invention, an apparatus for allocating semi-permanent resources in a BS of a VoIP based wireless communication system is provided. The apparatus includes a controller and a transmit end. If DRX of an MS for allocating semi-permanent resources is activated, the controller determines a slot to allocate semi-permanent resources to the MS, and allocates the semi-permanent resources to the MS every semi-permanent resource allocation cycle. If the DRX of the MS is activated, the transmit end transmits semi-permanent resource allocation instruction information to the MS according to the control of the controller, and transmits semi-permanent resource allocation information to the MS.

In accordance with yet another aspect of the present invention, an apparatus for operating DRX in an MS of a VoIP based wireless communication system is provided. The apparatus includes a receive end, a first timer, and a controller. The receive end receives a signal. The first timer is driven when semi-permanent resource allocation instruction information is received from a serving BS in a state where DRX is activated. The controller activates the DRX if a DRX cycle arrives, and determines semi-permanent resources according to a semi-permanent resource allocation cycle determined in the semi-permanent resource allocation information if semi-permanent resource allocation information is received from a serving BS in the course of driving the first timer. The controller separately operates the DRX cycle and the semi-permanent resource allocation cycle.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
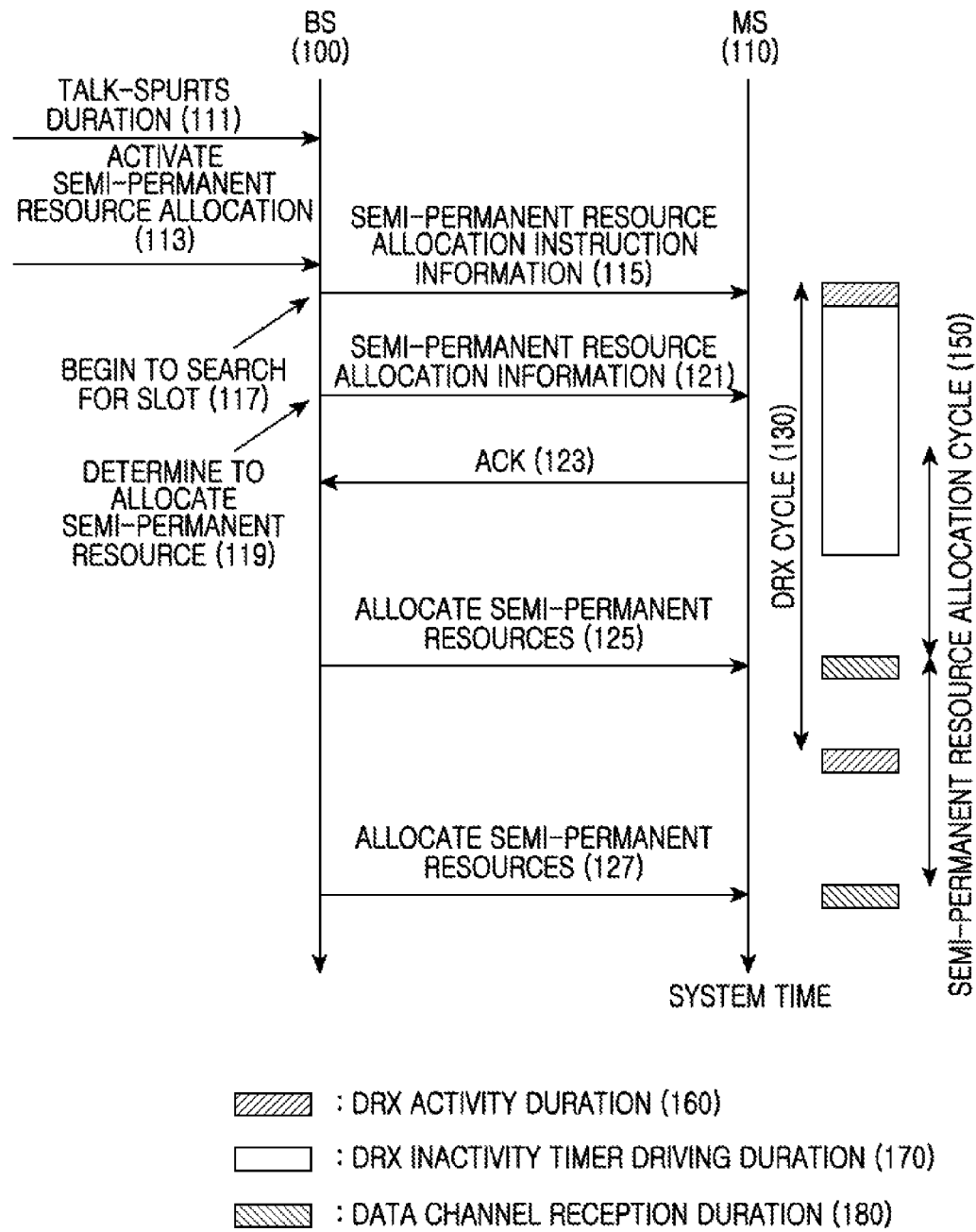
FIG. 1 is a ladder diagram illustrating a Discontinuous Reception (DRX) operation procedure in a Voice over Internet Protocol (VoIP) based wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Exemplary embodiments of the present invention provide a technology for operating a semi-permanent resource allocation technique and Discontinuous Reception (DRX) together in a Voice over Internet Protocol (VoIP) based wireless communication system.

Downlink VoIP services are, for example, described below. However, exemplary embodiments of the present invention are identically applicable to uplink VoIP services as well.

In the VoIP service, one VoIP call is configured by an iteration of a talk-spurts duration where voice packets are generated and a silent duration where no voice packets are generated. In a case of using the semi-permanent resource allocation technique, a Base Station (BS) allocates semi-permanent resources at a starting point of the talk-spurts duration, and releases the semi-permanent resources at a starting point of the silent duration.

In a case of operating the semi-resource allocation technique and the DRX together, a BS and an MS of the wireless communication system operate the semi-permanent resource allocation technique and the DRX as described in FIG. 1 below.

FIG. 1 illustrates a DRX operation procedure in a VoIP based wireless communication system according to an exemplary embodiment of the present invention.

Referring to FIG. 1, in the wireless communication system, an MS 110 is located within a service area of a BS 100, and is serviced from the BS 100.

If a starting point of a talk-spurts duration is detected in step 111, the BS 100 determines whether to activate a semi-permanent resource allocation technique.

In a case where it is determined to activate the semi-permanent resource allocation technique in step 113, the BS 100 determines if DRX of the MS 110 is activated. For example, the MS 110 determines a DRX operating parameter through signaling with the BS 100. Accordingly, the BS 100 can determine if the DRX of the MS 110 is activated using the DRX operating parameter of the MS 110. Here, the DRX operating parameter includes a DRX cycle representing a time point of iteration of activity/inactivity of an MS, an On duration timer representing an On duration of the MS, a DRX inactivity timer set to maintain activity of the MS during a preset period of time for the sake of a service of a dynamic and burst characteristic, and a Hybrid Automatic Repeat Request (HARQ) retransmission timer for retransmission.

In a case where the DRX of the MS 110 is activated, the BS 100 transmits semi-permanent resource allocation instruction information to the MS 110 in step 115. For example, in a case where dynamic resource allocation is available, the BS 100 transmits semi-permanent resource allocation instruction information to the MS 110 using a packet by the dynamic resource allocation. Alternatively, in a case where the dynamic resource allocation is unavailable, the BS 100 can transmit the semi-permanent resource allocation instruction information to the MS 110 using dummy assignment information. Here, the dummy assignment information is configured to include the semi-permanent resource allocation instruction information using a reserved field that is not used in a physical control channel for semi-permanent resource allocation release.

Thereafter, the BS 100 begins to search for a slot for semi-permanent resource allocation in step 117.

The MS 110 is activated every DRX cycle 130 and monitors a physical control channel during a DRX activity duration 160. At this time, if the DRX activity duration 160 lapses, the MS 110 is inactivated.

Also, the MS 110 drives a DRX inactivity timer according to the semi-permanent resource allocation instruction information provided from the BS 100. At this time, while the DRX inactivity timer is driven, the MS 110 maintains a DRX activity status, although getting out of the DRX activity duration 160. Here, a driving duration 170 of the DRX inactivity timer is set longer than a semi-permanent resource allocation cycle 150 such that the BS 100 can search for all slots capable of being allocated semi-permanent resources for the MS 110.

The BS 100 allocates semi-permanent resources to the MS 110 through the specific slot found in step 119. In step 121, the BS 100 transmits semi-permanent resource allocation information to the MS 110.

If the semi-permanent resource allocation information by the driving of the DRX inactivity timer is received, the MS 110 transmits reception success information (i.e., an ACKnowledgement (ACK)) to the BS 100 in step 123.

Thereafter, the BS 100 allocates and transmits semi-permanent resources to the MS 110 every semi-permanent resource allocation cycle 150 in steps 125 and 127.

The MS 110 is activated every semi-permanent resource allocation cycle 150 aside from the DRX cycle 130, and is allocated semi-permanent resources from the BS 100. That is, the MS 110 is activated during a data channel reception duration 180.

In an exemplary implementation, a BS 100 searches for a slot for semi-permanent resource allocation in step 117 after transmitting semi-permanent resource allocation instruction information to the MS 110 in step 115.

In another exemplary implementation, the BS 100 can also transmit semi-permanent resource allocation instruction information to the MS 110 in step 115 after beginning to search for a slot for semi-permanent resource allocation in step 117.

In a further exemplary implementation, the BS 100 can also simultaneously transmit semi-permanent resource allocation instruction information to the MS 110 in step 115 and search for a slot for semi-permanent resource allocation in step 117.

A method for allocating semi-permanent resources considering DRX operation of an MS in a BS is described in detail below with reference to FIG. 2. The following description is based on an assumption that the BS searches for a slot for semi-permanent resource allocation after transmitting semi-permanent resource allocation instruction information to the MS as described in FIG. 1.

Figure 2:
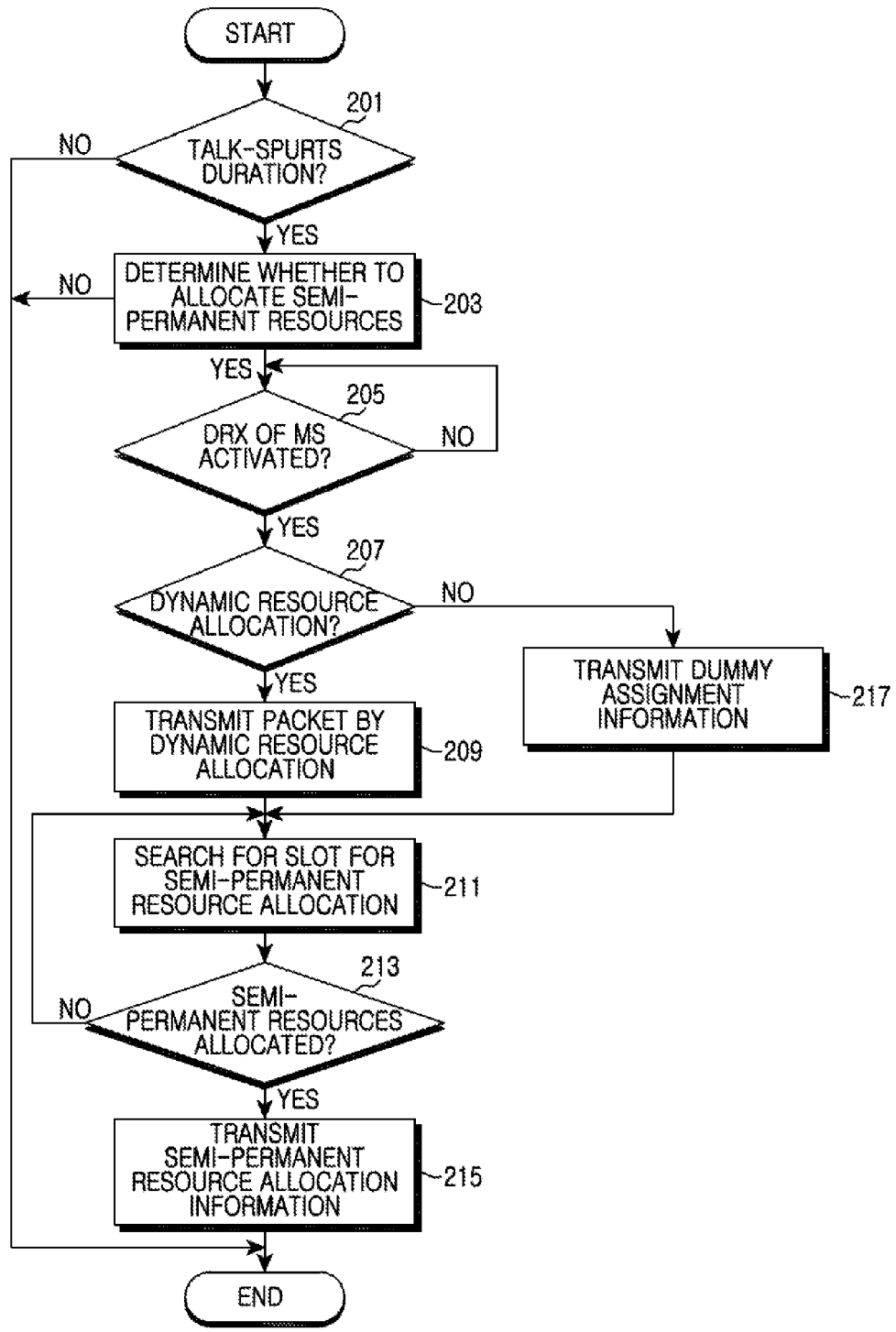
FIG. 2 is a flowchart illustrating a procedure for allocating semi-permanent resources in a Base Station (BS) according to an exemplary embodiment of the present invention.

FIG. 2 illustrates a procedure for allocating semi-permanent resources in a BS according to an exemplary embodiment of the present invention.

Referring to FIG. 2, in step 201, the BS determines if a talk-spurts duration is detected. That is, the BS determines if a starting point of the talk-spurts duration is detected.

If it is determined that the talk-spurts duration is detected, the BS determines whether to allocate semi-permanent resources to an MS providing service in step 203. For example, if it is determined that the talk-spurts duration is detected, the BS determines whether to activate a semi-permanent resource allocation technique. At this time, the BS can activate the semi-permanent resource allocation technique in step 203. On the other hand, if the BS does not activate the semi-permanent resource allocation technique, the BS terminates the procedure.

Thereafter, the BS determines if DRX of an MS is activated in step 205. For example, the MS determines a DRX operating parameter through signaling with the BS. Accordingly, the BS can determine if the DRX of the MS is activated using the DRX operating parameter of the MS. Here, the DRX operating parameter includes a DRX cycle representing a time point of iteration of activity/inactivity of an MS, an On duration timer representing an On duration of the MS, a DRX inactivity timer set to maintain activity of the MS during a preset period of time for the sake of a service of a dynamic and burst characteristic, and a HARQ retransmission timer for retransmission.

When the DRX of the MS is activated, the BS determines if dynamic resource allocation to the MS is available in step 207.

If it is determined that the dynamic resource allocation to the MS is available, the BS transmits semi-permanent resource allocation instruction information to the MS using a packet by dynamic resource allocation in step 209.

After transmitting the semi-permanent resource allocation instruction information, the BS searches for a slot for semi-permanent resource allocation in step 211.

On the other hand, if the dynamic resource allocation to the MS is unavailable in step 207, the BS transmits semi-permanent resource allocation instruction information to the MS using dummy assignment information in step 217. Here, the dummy assignment information is configured to include the semi-permanent resource allocation instruction information using a reserved field that is not used in a physical control channel for semi-permanent resource allocation release.

After transmitting the semi-resource allocation instruction information, the BS searches for a slot for semi-permanent resource allocation in step 211.

The BS then determines if it allocates semi-permanent resources to the MS through a found slot in step 213.

If it is determined that the allocation of the semi-permanent resources to the MS fails, the BS searches for a slot for semi-permanent resource allocation in step 211.

On the other hand, if it is determined that the semi-permanent resources are allocated to the MS in step 213, the BS transmits semi-permanent resource allocation information to the MS in step 215. Thereafter, the BS allocates and transmits semi-permanent resources to the MS every semi-permanent resource allocation cycle.

Thereafter, the BS terminates the procedure.

A method for operating DRX considering semi-permanent resource allocation in an MS is described below with reference to FIG. 3.

Figure 3:
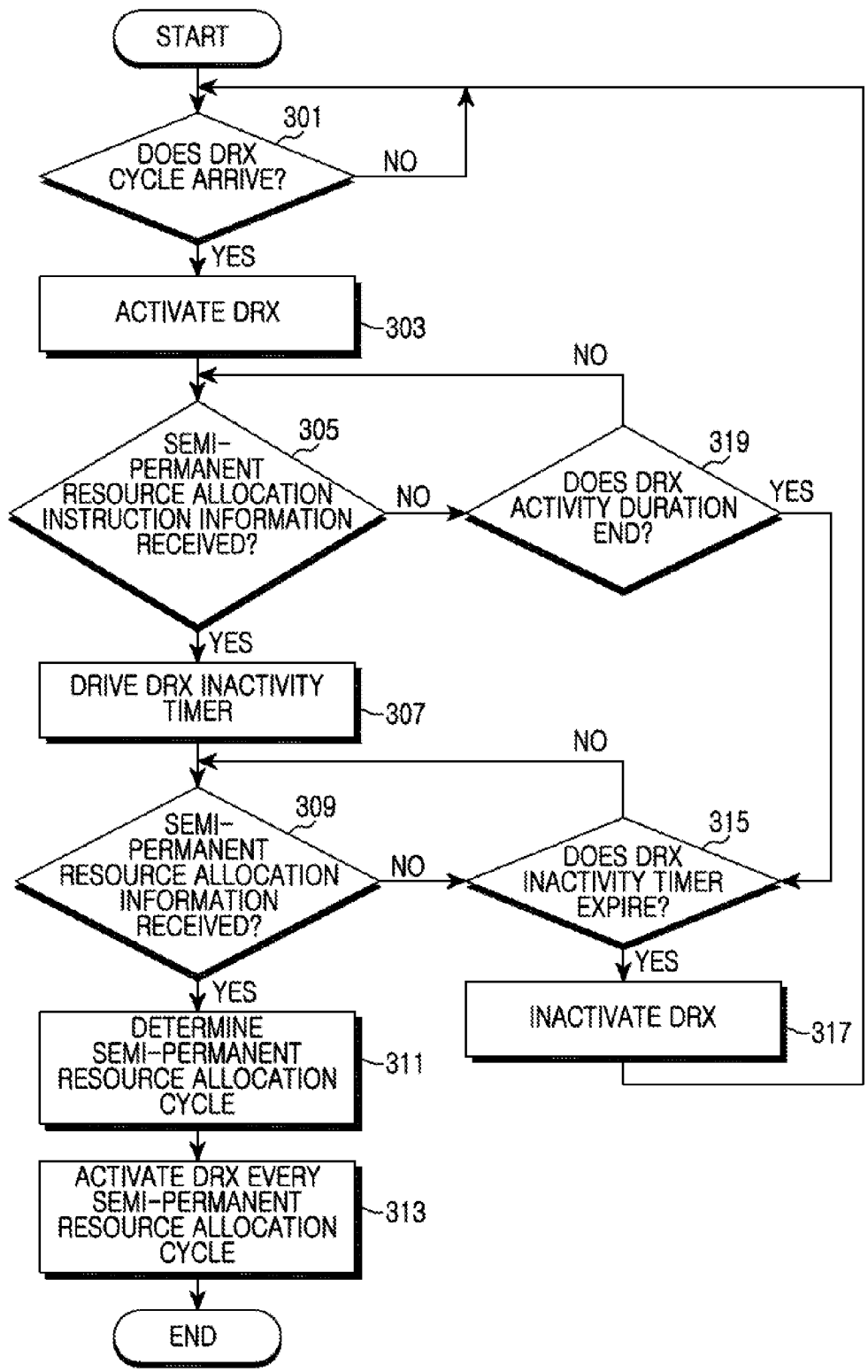
FIG. 3 is a flowchart illustrating a procedure of DRX operation of a Mobile Station (MS) according to an exemplary embodiment of the present invention.

FIG. 3 illustrates a procedure of DRX operation of an MS according to an exemplary embodiment of the present invention.

Referring to FIG. 3, in step 301, the MS determines if a DRX cycle arrives.

If it is determined that the DRX cycle does not arrive, the MS maintains a DRX inactivity status while continuing to determine if the DRX cycle arrives.

On the other hand, if it is determined that the DRX cycle arrives, the MS activates DRX in step 303.

Thereafter, the MS determines if semi-permanent resource allocation instruction information is received from a serving BS in step 305. For example, the MS determines if a packet including semi-permanent resource allocation instruction information transmitted through dynamic resource allocation is received from the serving BS. Alternatively, although not illustrated, the MS determines if dummy assignment information including semi-permanent resource allocation instruction information is received from the serving BS.

If it is determined that the semi-permanent resource allocation instruction information is not received, the MS determines if a DRX activity duration ends in step 319.

If it is determined that the DRX activity duration does not end in step 319, the MS returns to step 305 and determines if semi-permanent resource allocation instruction information is received from the serving BS.

On the other hand, if it is determined that the DRX activity duration ends in step 319, although not illustrated, the MS returns to step 301 and transits to a DRX inactivity status and determines if the DRX cycle arrives. Alternatively, if it is determined that a DRX activity duration ends, the MS also determines if a DRX inactivity timer expires in step 315. If it is determined that the DRX inactivity timer is driven, the MS maintains a DRX activity status, although the DRX activity duration ends.

If it is determined that the semi-permanent resource allocation instruction information is received in step 305, the MS drives a DRX inactivity timer in step 307. Here, a driving duration of the DRX inactivity timer is set longer than a semi-permanent resource allocation cycle such that the serving BS can search for all slots for semi-permanent resource allocation to determine semi-permanent resources to be allocated to an MS.

The MS then determines if semi-permanent resource allocation information is received from the serving BS in step 309.

If it is determined that the semi-permanent resource allocation information is not received from the serving BS in step 309, the MS determines if the DRX inactivity timer expires in step 315. That is, the MS determines if the DRX inactivity timer is driven.

If it is determined that a driving duration of the DRX inactivity timer expires in step 315, the MS inactivates the DRX in step 317.

On the other hand, if it is determined that the DRX inactivity timer is driven in step 315, the MS determines if semi-permanent resource allocation information is received from the serving BS in step 309.

If it is determined that the semi-permanent resource allocation information is received from the serving BS in step 309, the MS determines semi-permanent resource allocation operation information in step 311. For example, the MS determines the semi-permanent resource allocation cycle.

Thereafter, the MS activates a data reception channel every semi-permanent resource allocation cycle and is allocated semi-permanent resources from the serving BS in step 313. At this time, the MS operates the semi-permanent resource allocation cycle independently from the DRX cycle.

Next, the MS terminates the procedure.

As described above, the MS operates a semi-permanent resource allocation cycle aside from a DRX cycle. That is, even when the DRX cycle does not arrive, the MS activates a reception channel to be allocated semi-permanent resources from a serving BS, when the semi-permanent resource allocation cycle arrives.

A construction of a BS for allocating semi-permanent resources considering DRX operation of an MS is described below with reference to FIG. 4.

Figure 4:
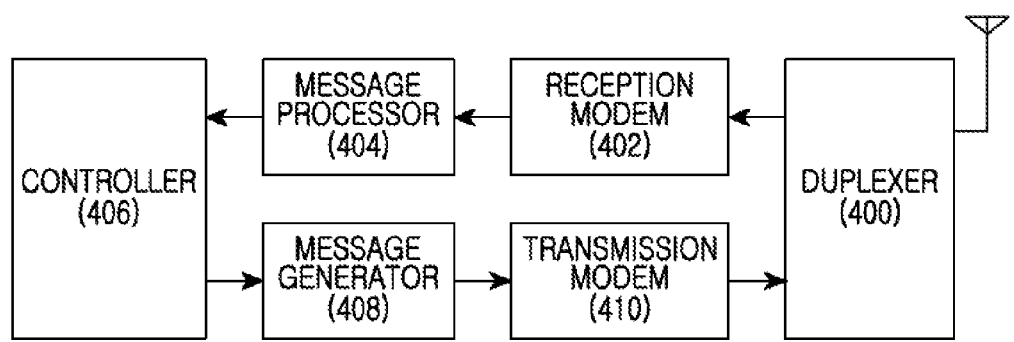
FIG. 4 is a block diagram illustrating a construction of a BS in a VoIP based wireless communication system according to an exemplary embodiment of the present invention.

FIG. 4 illustrates a construction of a BS in a VoIP based wireless communication system according to an exemplary embodiment of the present invention.

Referring to FIG. 4, the BS includes a duplexer 400, a reception modem 402, a message processor 404, a controller 406, a message generator 406, and a transmission modem 410.

The duplexer 400 transmits a transmit signal provided from the transmission modem 410 through an antenna according to a duplexing scheme, and provides a receive signal from the antenna to the reception modem 402.

The reception modem 402 converts and demodulates a Radio Frequency (RF) signal provided from the duplexer 400 into a baseband signal. The reception modem 402 can include an RF processing block, a demodulation block, a channel decoding block and the like. The RF processing block (not illustrated) converts an RF signal provided from the duplexer 400 into a baseband signal according to the control of the controller 406. The demodulation block (not illustrated) includes a Fast Fourier Transform (FFT) operator and the like for extracting data loaded on each subcarrier from a signal provided from the RF processing block. The channel decoding block (not illustrated) includes a demodulator, a de-interleaver, a channel decoder and the like.

The message processor 404 extracts control information from a signal provided from the reception modem 402 and provides the control information to the controller 406.

The controller 406 controls a general operation of the BS.

The controller 406 allocates semi-permanent resources considering DRX operation of an MS providing service. For example, if a starting point of a talk-spurts duration is detected, the controller 406 determines whether to activate a semi-permanent resource allocation technique.

If determining to activate the semi-permanent resource allocation technique, the controller 406 controls to transmit semi-permanent resource allocation instruction information to the MS when DRX of the MS is activated. Also, the controller 406 controls to search for a slot for semi-permanent resource allocation when the DRX of the MS is activated.

If allocating the semi-permanent resources to the MS through a found slot, the controller 406 controls to transmit semi-permanent resource allocation information to the MS.

Thereafter, the controller 406 allocates semi-permanent resources to the MS every semi-permanent allocation cycle.

The message generator 408 generates a control message to be transmitted to at least one MS located in a service area according to the control of the controller 406. For example, the message generator 408 generates a control message including semi-permanent resource allocation instruction information according to the control of the controller 406. At this time, if dynamic resource allocation to the MS is available, the message generator 408 generates a physical control channel including semi-permanent resource allocation instruction information. On the other hand, if the dynamic resource allocation to the MS is unavailable, the message generator 408 generates dummy assignment information including semi-permanent resource allocation instruction information. Here, the dummy assignment information is configured to include the semi-permanent resource allocation instruction information using a reserved field that is not used in a physical control channel for semi-permanent resource allocation release.

The transmission modem 410 encodes and converts data to be transmitted to an MS and a control message provided from the message generator 408, into an RF signal, and transmits the RF signal to the duplexer 400. The transmission modem 410 can include a channel encoding block, a modulation block, an RF processing block and the like. The channel encoding block (not illustrated) includes a modulator, an interleaver, a channel encoder and the like. The modulation block (not illustrated) includes an Inverse Fast Fourier Transform (IFFT) operator and the like for mapping a signal provided from the channel encoding block to each subcarrier. The RF processing block (not illustrated) converts a baseband signal provided from the modulation block into an RF signal, and outputs the RF signal to the duplexer 400.

A construction of an MS for operating DRX considering semi-permanent resource allocation is described below with reference to FIG. 5.

Figure 5:
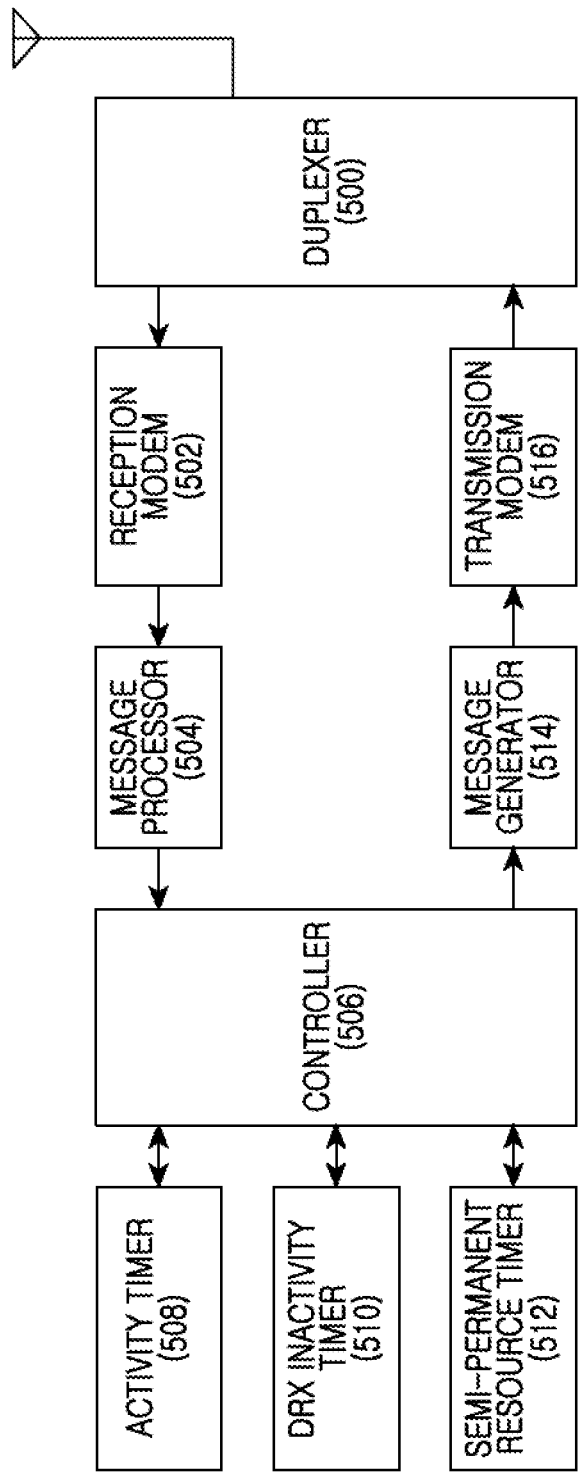
FIG. 5 is a block diagram illustrating a construction of an MS in a VoIP based wireless communication system according to an exemplary embodiment of the present invention.

FIG. 5 illustrates a construction of an MS in a VoIP based wireless communication system according to an exemplary embodiment of the present invention.

Referring to FIG. 5, the MS includes a duplexer 500, a reception modem 502, a message processor 504, a controller 506, an activity timer 508, a DRX inactivity timer 510, a semi-permanent resource timer 512, a message generator 514, and a transmission modem 516.

The duplexer 500 transmits a transmit signal provided from the transmission modem 516 through an antenna according to a duplexing scheme, and provides a receive signal from the antenna to the reception modem 502.

The reception modem 502 converts and demodulates an RF signal provided from the duplexer 500 into a baseband signal. The reception modem 502 can include an RF processing block, a demodulation block, a channel decoding block and the like. The RF processing block (not illustrated) converts an RF signal provided from the duplexer 500 into a baseband signal according to the control of the controller 506. The demodulation block (not illustrated) includes an FFT operator and the like for extracting data loaded on each subcarrier from a signal provided from the RF processing block. The channel decoding block (not illustrated) includes a demodulator, a de-interleaver, a channel decoder and the like.

The message processor 504 extracts control information from a signal provided from the reception modem 502 and provides the control information to the controller 506. For example, the message processor 504 extracts semi-permanent resource allocation instruction information and semi-permanent resource allocation information from a receive signal, and provides the extracted information to the controller 506.

The controller 506 controls a general operation of the MS.

The controller 506 operates the DRX considering semi-permanent resource allocation of a serving BS.

If a DRX cycle arrives, the controller 506 activates the DRX, and drives the activity timer 508. At this time, if a driving duration of the activity timer 508 expires, the controller 506 inactivates the DRX.

Also, if the controller 506 receives semi-permanent resource allocation instruction information from the message processor 504, the controller 506 drives the DRX inactivity timer 510. At this time, if the DRX inactivity timer 510 is driven, the controller 506 maintains a DRX activity status although the driving duration of the activity timer 508 expires.

If the controller 506 receives semi-permanent resource allocation information from the message processor 504, the controller 506 activates a data reception channel every semi-permanent resource allocation cycle to be allocated semi-permanent resources. In this case, the controller 506 operates the semi-permanent resource allocation cycle independently from the DRX cycle. That is, even when the DRX cycle does not arrive, the controller 506 activates the data reception channel in order to be allocated semi-permanent resources from a serving BS, if the semi-permanent resource allocation cycle arrives.

If the DRX cycle arrives, the activity timer 508 is driven by the controller 506. Thereafter, if the driving duration expires, the activity timer 508 transmits driving duration expiration information to the controller 506.

If the DRX inactivity timer 510 receives semi-permanent resource allocation instruction information, the DRX inactivity timer 510 is driven according to the control of the controller 506. Thereafter, if the driving duration expires, the DRX inactivity timer 510 transmits driving duration expiration information to the controller 506. Here, the driving duration of the DRX inactivity timer 510 is set longer than a semi-permanent resource allocation cycle such that the BS can search for all slots capable of allocating semi-permanent resources to the MS.

In a case where semi-permanent resource allocation information is received, the semi-permanent resource timer 512 is driven according to the control of the controller 506. Thereafter, the semi-permanent resource timer 512 informs the controller 506 that the semi-permanent resource allocation cycle arrives.

The message generator 514 generates a control message to be transmitted to a serving BS according to the control of the controller 506.

The transmission modem 516 encodes and converts data to be transmitted to a BS and a control message provided from the message generator 514, into an RF signal, and transmits the RF signal to the duplexer 500. The transmission modem 516 can include a channel encoding block, a modulation block, an RF processing block and the like. The channel encoding block (not illustrated) includes a modulator, an interleaver, a channel encoder and the like. The modulation block (not illustrated) includes an IFFT operator and the like for mapping a signal provided from the channel encoding block to each subcarrier. The RF processing block (not illustrated) converts a baseband signal provided from the modulation block into an RF signal, and outputs the RF signal to the duplexer 500.

As described above, the exemplary embodiments of the present invention can increase scheduling flexibility for semi-permanent resource allocation, by setting a DRX activity duration and a separate DRX inactivity timer driving duration for semi-permanent resource allocation at the time of DRX operation of an MS in a VoIP based wireless communication system.

Also, the exemplary embodiments of the present invention can advantageously minimize a DRX activity duration while maintaining scheduling flexibility for semi-permanent resource allocation, by independently operating a DRX cycle and a semi-permanent resource allocation cycle at the time of DRX operation of an MS in a VoIP based wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operating a Base Station (BS) of a wireless communication system, the method comprising:
   determining if Discontinuous Reception (DRX) of a Mobile Station (MS) for allocating semi-permanent resources has been activated;
   if the DRX of the MS has been activated during a DRX cycle, transmitting to the MS, semi-permanent resource allocation instruction information to drive a DRX inactivity timer for maintaining a status of on duration of a DRX in the MS;
   determining a slot corresponding to a DRX inactivity duration, while the DRX inactivity timer is driven by the MS;
   if the slot to allocate the semi-permanent resources to the MS is determined, transmitting semi-permanent resource allocation information indicating the slot to the MS; and
   allocating the semi-permanent resources to the MS during every semi-permanent resource allocation cycle as well as during the DRX cycle,
   wherein the DRX cycle and the semi-permanent resource allocation cycle are operated separately.

2. The method of claim 1, further comprising:
   if a starting point of a talk-spurts duration is detected, determining whether to allocate semi-permanent resources; and
   determining if the DRX of the MS has been activated, when determining to allocate the semi-permanent resources.

3. The method of claim 1, wherein the semi-permanent resource allocation instruction information is transmitted to the MS using any one of a packet by dynamic resource allocation and dummy assignment information.

4. The method of claim 3, wherein the dummy assignment information is configured to comprise the semi-permanent resource allocation instruction information using a reserved field that is not used in a physical control channel for semi-permanent resource allocation release.

5. An apparatus for a Base Station (BS) of a wireless communication system, the apparatus comprising:
   a controller configured to, if Discontinuous Reception (DRX) of a Mobile Station (MS) for allocating semi-permanent resources is activated during a DRX cycle, determine a slot corresponding to a DRX inactivity duration to allocate semi-permanent resources to the MS, while the DRX inactivity timer is driven by the MS, and to allocate the semi-permanent resources to the MS during the DRX and every semi-permanent resource allocation cycle as well as during the DRX cycle; and
   a transmit end configured to, if the DRX of the MS is activated, transmit semi-permanent resource allocation instruction information driving a DRX inactivity timer to maintain a DRX activity status when the DRX of the MS gets out of a DRX activity duration, to the MS according to the control of the controller, and to transmit semi-permanent resource allocation information indicating slot to the MS,
   wherein the DRX cycle and the semi-permanent resource allocation cycle are operated separately.

6. The apparatus of claim 5, wherein, if a starting point of a talk-spurts duration is detected, the controller determines whether to allocate semi-permanent resources.

7. The apparatus of claim 5, wherein the transmit end transmits the semi-permanent resource allocation instruction information to the MS using a packet by at least one of dynamic resource allocation and dummy assignment information.

8. The apparatus of claim 7, wherein the dummy assignment information is configured to comprise the semi-permanent resource allocation instruction information using a reserved field that is not used in a physical control channel for semi-permanent resource allocation release.

* * * * *